(12) United States Patent
Kanioz (10) Patent No.: US 9,618,073 B2
(45) Date of Patent: *Apr. 11, 2017

(54) SHOCK ABSORBER HAVING AN IMPROVED FRICTION ELEMENT

(71) Applicant: Aksistem Elektromekanik San. ve Tic. Ltd. Sti., Kocaeli (TR)

(72) Inventor: Adil Kanioz, Kocaeli (TR)

(73) Assignee: Aksistem Elektromekanik San. ve Tic. Ltd. Sti., Kocaeli (TR)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,973

(22) Filed: Mar. 28, 2016

(65) Prior Publication Data

US 2016/0208881 A1    Jul. 21, 2016

Related U.S. Application Data

(63) Continuation of application No. 14/118,203, filed on Nov. 15, 2013, now Pat. No. 9,297,434.

(51) Int. Cl.
*F16F 7/09* (2006.01)
*D06F 37/20* (2006.01)

(52) U.S. Cl.
CPC ............... *F16F 7/09* (2013.01); *D06F 37/20* (2013.01)

(58) Field of Classification Search
CPC .............. F16F 7/087; F16F 7/09; D06F 37/20
See application file for complete search history.

(56) References Cited

U.S. PATENT DOCUMENTS

| 2,782,765 | A | * | 2/1957 | Robinson | .................. | B30B 1/08 92/12 |
| 2,984,529 | A | * | 5/1961 | Dailey | .................. | F04B 53/143 277/438 |
| 3,913,460 | A | | 10/1975 | Wright | | |
| 4,606,442 | A | * | 8/1986 | Paton | ..................... | B60G 13/04 188/129 |
| 5,224,413 | A | | 7/1993 | Herner | | |
| 6,247,687 | B1 | * | 6/2001 | Jensen | ................... | B64C 25/64 188/129 |
| 2005/0016805 | A1 | * | 1/2005 | Brehm | ..................... | F16F 9/585 188/315 |

(Continued)

FOREIGN PATENT DOCUMENTS

| DE | 4014166 A1 | 11/1991 |
| DE | 10325730 A1 | 1/2005 |

(Continued)

*Primary Examiner* — Bradley King
(74) *Attorney, Agent, or Firm* — Gokalp Bayramoglu (57) ABSTRACT

A shock absorber comprising a tubular first portion in the form of a shock absorber casing telescopically receiving a tubular second portion in the form of a piston is disclosed. The first portion has an alignment member which encapsulates a friction element wrapped around said second portion. The alignment member is longitudinally movable in between a first stop bearing and a second stop bearing. The novel friction element has a plurality of tips or protrusions which extend, parallel to the longitudinal direction of the piston, towards the two stop bearings and which hit either of said bearings during the oscillatory back and forth movement of the alignment member during operation.

15 Claims, 5 Drawing Sheets

(56) References Cited

U.S. PATENT DOCUMENTS

2008/0264744 A1* 10/2008 Atwater .................. F16F 7/09
                                                                                                 188/381

FOREIGN PATENT DOCUMENTS

| EP | 0301190 A1 | 2/1989 |
|----|------------|--------|
| EP | 1455011 A1 | 9/2004 |
| EP | 1637640 A1 | 3/2006 |
| EP | 1862694 A1 | 12/2007 |
| JP | 2004239375 A * | 8/2004 |
| KR | 20080086168 A | 9/2008 |
| WO | WO9826194 A1 | 6/1998 |
| WO | WO9830812 A1 | 7/1998 |
| WO | WO2010103349 A1 | 9/2010 |

* cited by examiner

SHOCK ABSORBER HAVING AN IMPROVED FRICTION ELEMENT

BACKGROUND OF THE INVENTION

Field of the Invention

This present invention relates to a shock absorber having an improved friction element. The shock absorber is typically used for dampening vibrations received from drums of washing machines.

Prior Art

Shock absorbers within washing machines are commonly used to eliminate dynamic load distribution over longitudinal and transversal aces of the absorbers. To that end a shock absorber, while absorbing a dynamic load distribution, eliminates noise associated with irregular load distribution caused by unbalanced rotation of the drum. To reduce noise level at a satisfactorily sufficient degree is of paramount importance in the country of the present applicant. Successful noise management is essentially important for the manufacturer as the associated disturbing effect for the consumers is very decisive in the market.

EP 1 637 640 A1 discloses a damper which has two fastening units mounted on a free end of a tubular casing and a tappet respectively. A frictional damping unit disposed inside the casing has an elastic frictional damping lining displaceable in the casing and the tappet along a central longitudinal axis for producing a damping effect. A stop unit is stationary in relation to the casing and has direct cooperation with the lining for motion damping.

WO98/26194 A1 relates to a friction damper which has been specifically designed for washing machines or the like. The damper comprises a hollow shell and a rod, coaxially arranged, which form a telescopic construction. The rod is provided with an outer diameter smaller than the inner diameter of the shell, and between the shell and the rod, guiding means are provided. The damper further comprises a friction damper element arranged between the rod and the shell and having a first working surface which is frictionally slidably coupled to the rod and a second working surface which is frictionally slidably coupled with the shell.

While additional features and advantages of the present invention will be apparent from the detailed description, the main object of the invention is achieved in a shock absorber device as set forth in Claim 1.

OBJECTS OF THE INVENTION

One of the objects of the present invention is to provide a shock absorber having a friction element more efficient in terms of dampening capacity and less noisy compared to existing absorbers.

Another object of the present invention is to provide a shock absorber which is more cost-efficient in terms of manufacturing costs.

SUMMARY OF THE INVENTION

The shock absorber device according to the present invention is used in a washing machine comprising a motor for conventionally effecting rotation of a drum where washing process takes place. The shock absorber comprises a tubular first portion in the form of a shock absorber casing telescopically receiving a tubular second portion in the form of a piston. The first portion has an alignment member which encapsulates a friction element wrapped around said second portion. The alignment member is longitudinally movable in between a first stop bearing and a second stop bearing. The novel friction element has a plurality of tips or protrusions which extend, parallel to the longitudinal direction of the piston, towards the two stop bearings and which hit either of said bearings during the oscillatory back and forth movement of the alignment member during operation.

Said second portion in the form of a cylindrical piston longitudinally movable within said casing surrounding the same is associated with a friction element alignment member disposed between said first portion and said second portion. Further, a lock ring on the first portion leans against said second portion such that said friction element alignment member is held in integrity within said first portion. On the other hand, a friction element is provided in the manner to be compressed between the inner surface of said friction element alignment member and the outer surface of the second portion.

BRIEF DESCRIPTION OF THE FIGURES

The figures whose brief explanations are herewith provided are solely intended for providing a better understanding of the present invention and are as such not intended to define the scope of protection or the context in which said scope is interpreted in the absence of the description.

DETAILED DESCRIPTION OF THE INVENTION

The shock absorber of the present invention provides an improved friction element which is easier and cost-efficient to manufacture thanks to the simplicity of the friction element design and which is more efficient in terms of dampening activity as it is provided with a plurality of dampening protrusions irrespective of the presence of additional dampening means.

Therefore a more robust damper application is achieved by way of developing a low-noise and low-wear shock absorber such that a substantially tubular casing which has a central longitudinal axis with a free end along which a piston is displaceably guided in the casing. A frictional damping unit for producing a given frictional damping effect between the casing and the piston provides the effect of damping and centering any deflection of the piston crosswise of the central longitudinal axis of the casing. To that end, the present invention provides the advantageous effect that a damper with a guiding damping unit attenuate any radial deflections of the damper to center the tappet piston in the casing in more reliable, cost-efficient manner.

The shock absorber device (11) according to the present invention is used in a washing machine comprising a motor for conventionally effecting rotation of a drum where washing process takes place. The horizontal axis around which said motor rotates said drum is typically perpendicular to the plane of a front window allowing access to the inside of said drum.

The drum is typically secured to the appliance's casing by means of suitable elements such as a spring element at the two ends of which suspension rings are provided to establish said drum's upper connection to the machine body. Besides the shock absorbers provided according to the present invention establish the connection between said drum and the machine's base as will be delineated hereinafter in a detailed manner.

Figure 1:
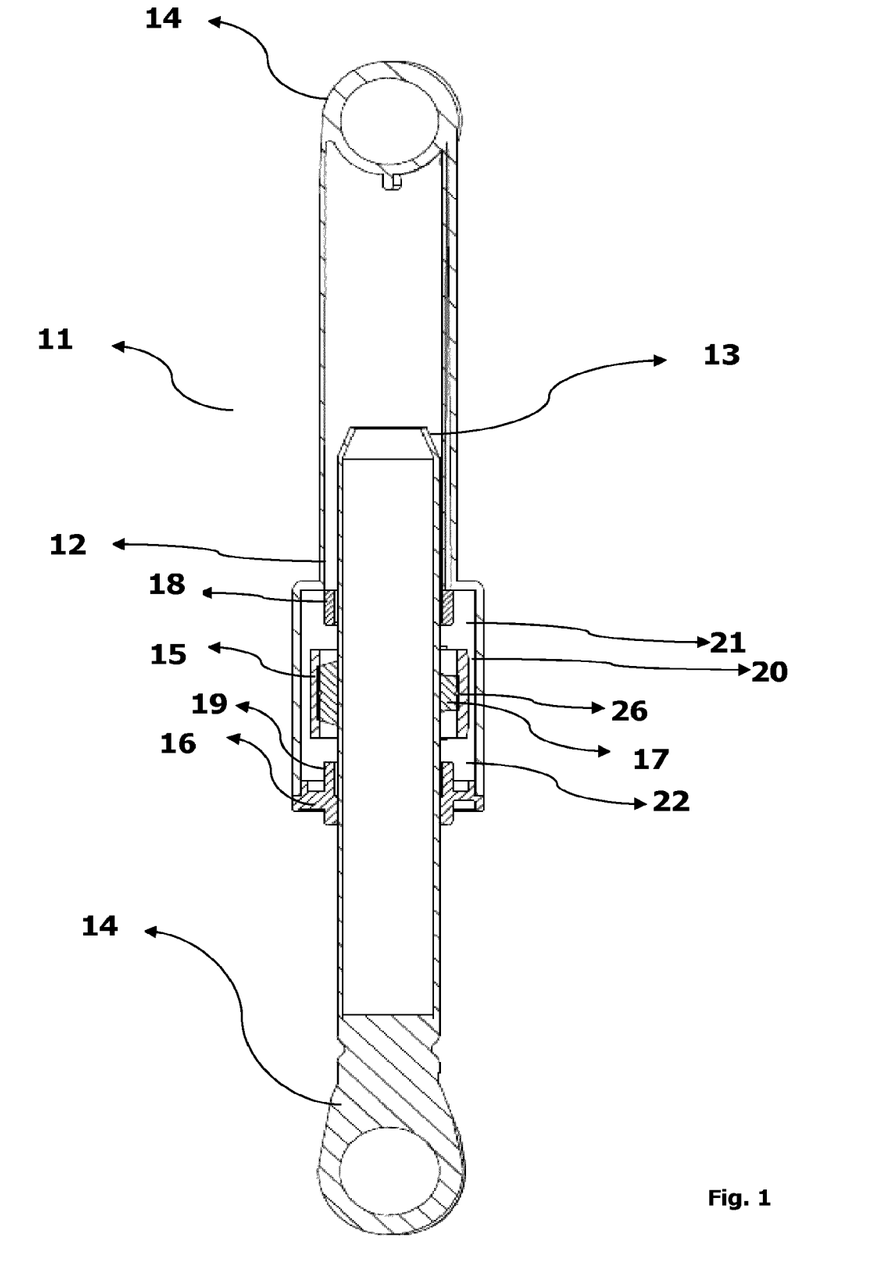
FIG. 1 demonstrates a cross-sectional view of the shock absorber device according to the present invention.

The shock absorber typically comprises a first portion in the form of a shock absorber casing (12) telescopically receiving a second portion, namely a piston (13) longitudinally movable within said casing (12). Both said first portion and said second portion are equipped at the ends with connection elements (14) respectively providing coupling to said drum and the washing machine frame via suitable connection elements such as support brackets already well-know known to the person skilled in the art. As also evident to the skilled person, said piston (13) and said casing (12) portions can move around the central axes of the bottom and top connection elements (14) respectively.

Said second portion in the form of a cylindrical piston (13) is longitudinally movable within said casing (12) surrounding the same whereby a friction element alignment member (15) is disposed between said first portion and said second portion. Further, a lock ring (16) on the first portion leans against said second portion such that said first portion is guided to move along the primary axis of said second portion, during which movement dampening effect occurs. A friction element (17) is provided in the manner to be compressed between the inner surface of said friction element alignment member (15) and the outer surface of the piston (13). During the oscillatory relative movement of said first and second portions, friction occurs in between the friction element (17) and the piston (13). The alignment member (15) encapsulates and presses the friction element (17) radially towards the outer surface of the piston (13) to provide a good contact for establishing friction.

The movement of the shock absorber casing (12) with respect to the shock absorber piston (13) on the longitudinal axis of the shock absorber device progresses such that either said drum displaces in upward direction and said shock absorber device extends upwards to compensate said drum's displacement or said drum moves towards the machine base and said shock absorber device acquires its shortened position such that said piston (13) is introduced into said casing (12) at least partially whereby said drum's lowermost position is achieved.

It is to be noted that it is common practice to take necessary measures in terms of mechanical design of said first and second portions (12, 13) of said shock absorber device where relative movement of said casing (12) with respect to said piston (13) in the longest or shortest states of said shock absorber device is restricted such that said two portions always remain engaged into each other. Conic formations in the form of casing stopper conic and reciprocal piston stopper conic may preferably fulfill this function.

The movement of the shock absorber piston (13) in the longitudinal axis within the casing (12) is enabled by the casing (12) and lock ring (16) stop bearings (18, 19) guiding in the inside of the casing (12) and the lock ring (16). The bearing (18) within the shock absorber casing (12) and the bearing (19) within the lock ring (16) bear the preferably tubular metal part of the shock absorber piston (13) such that there will be a very slight contact.

A further aspect of the present invention lies in that said stop bearings (18, 19) are intended to position the shock absorber piston (13) precisely on the center of the longitudinal axis of the shock absorber casing (12) such that the friction element alignment member (15) does not contact the shock absorber casing (12) along the longitudinal axis. To that end, the bearing gap (20) in between the shock absorber casing (12) and the friction element alignment member (15) is formed by the upper and lower isolation spaces (21, 22) extending above and below said bearing gap (20).

The design of the shock absorber (11) allows the bearings (namely said casing bearing 18 and said lock ring bearing 19) to exert a certain force on the shock absorber piston (13). The isolation spaces (21, 22) longitudinally at both sides and the bearing gap (20) thereinbetweein avoid contact of the friction element alignment member (15) with the casing (12), said member (15) compressing said friction element (17) towards the shock absorber piston (13) as described above. Evidently, vibrations are not transferred from the washing machine drum to the washing machine base in the longitudinal axis direction due to the dampening effect of the shock absorber.

The lock ring's (16) primary function is to keep integrity of the shock absorber system incorporating said shock absorber casing (12), shock absorber piston (13) and the friction element alignment member (15). It fits into the shock absorber casing (12) in a slightly tightened manner.

Figure 7:
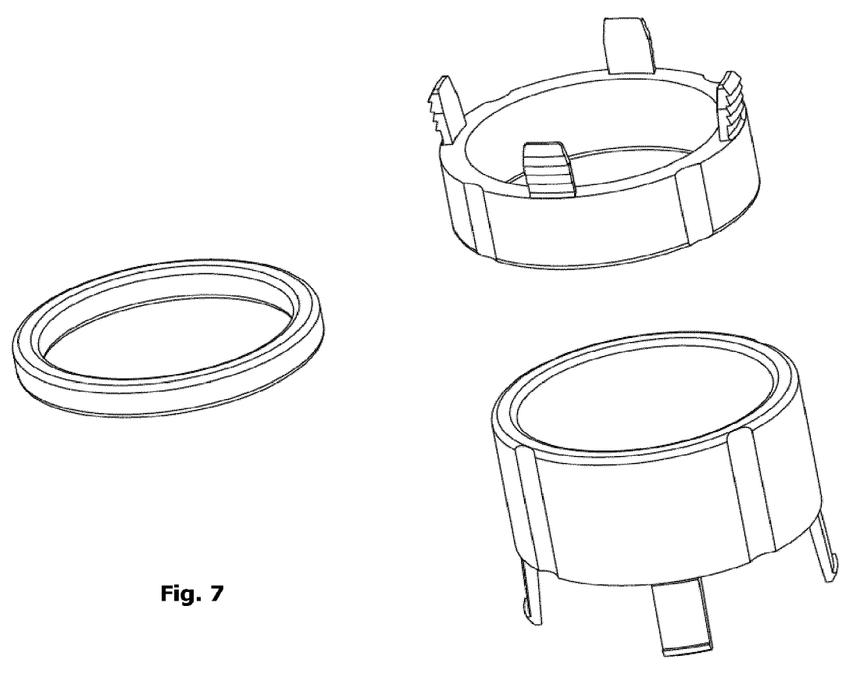
FIG. 7 demonstrates perspective views of the shock absorber device stopping bearings according to the present invention.

In another aspect, FIG. 7 demonstrates perspective views of the shock absorber stopping bearings (18, 19) according to the present invention. Said bearings (18,19) may also be designed as an embodiment comprising no pins, i.e. protruding end parts.

Figure 2:
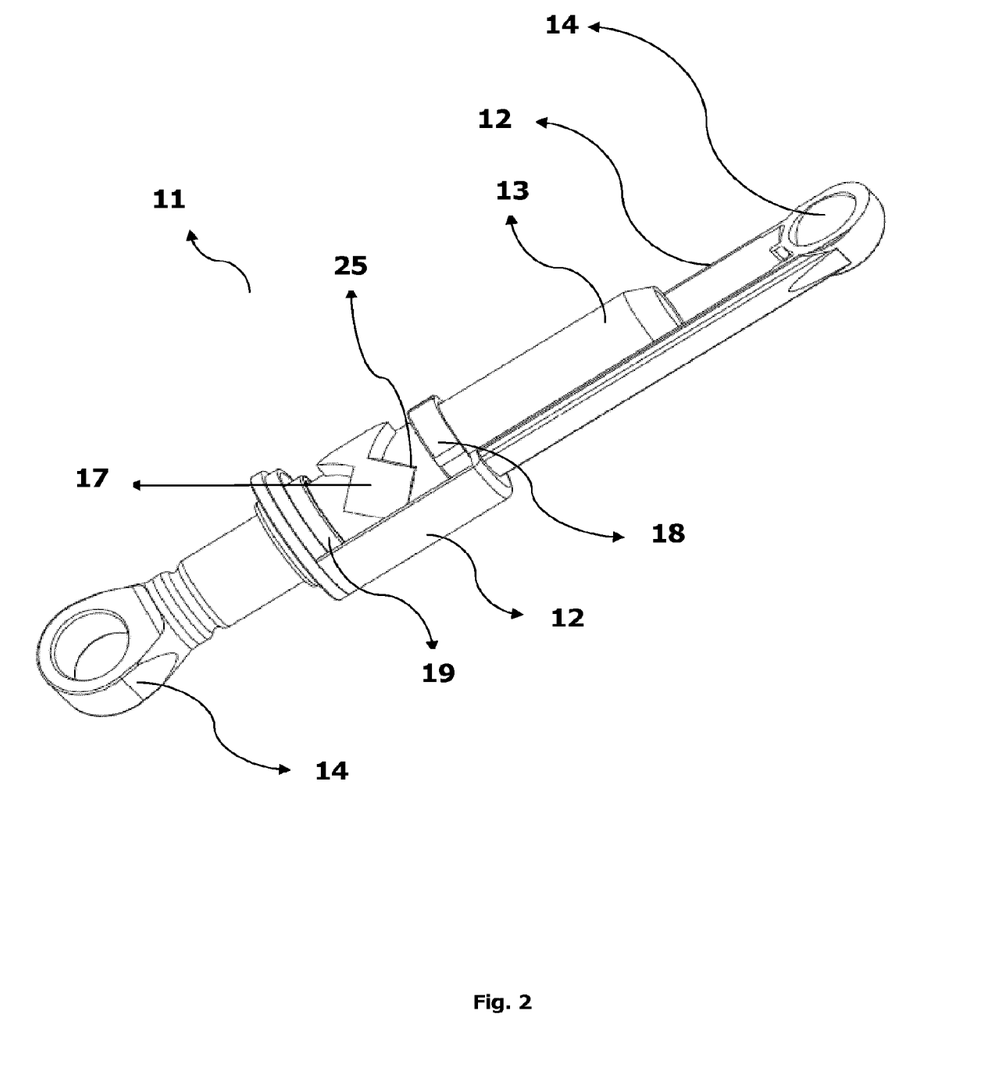
FIG. 2 demonstrates a perspective view of the shock absorber device indicating relative positioning of inner elements according to the present invention.
Figure 3:
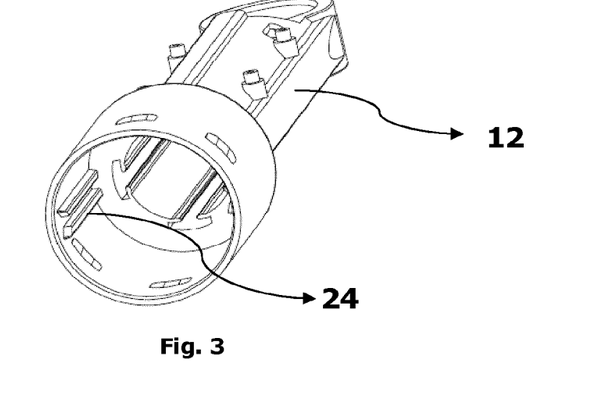
FIG. 3 demonstrates a perspective view of the shock absorber device casing according to the present invention.

The function of the friction element alignment member (15) is to force said friction element (17) radially towards the shock absorber piston (13) such that a damping effect is produced during the oscillatory relative movement of said piston and said casing. As is seen in FIG. 2, the friction element (17) has a freedom to move in a certain distance in between the two stop bearings (18) and (19). The alignment member (15) is excluded in FIG. 2 in order to better show the amount of play which the friction element (17) would move back and forth in the longitudinal direction of the piston (13). The friction element (17) is entrapped within a closed volume the outer ends of which are defined by the two bearings (18) and (19). The friction element (17) does not move with respect to the alignment member (15). The distance in between the two bearings (18) and (19) is defined as the amount of play of the friction element (17) during the oscillatory movement of the piston (13) with respect to the casing (12).

Figure 5A:
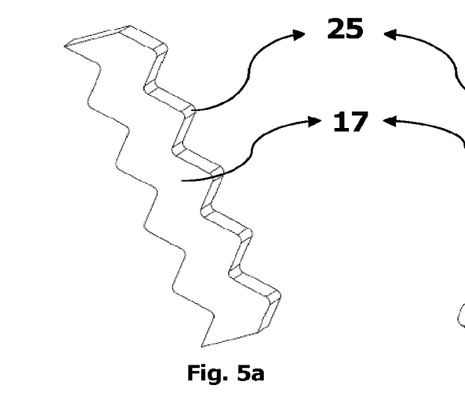
FIG. 5a demonstrates an extended planar view of the shock absorber device friction element according to the present invention.
Figure 5B:
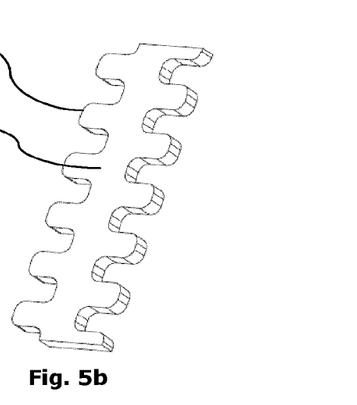
FIG. 5b demonstrates an alternative embodiment of said shock absorber device friction element according to the present invention.
Figure 6:
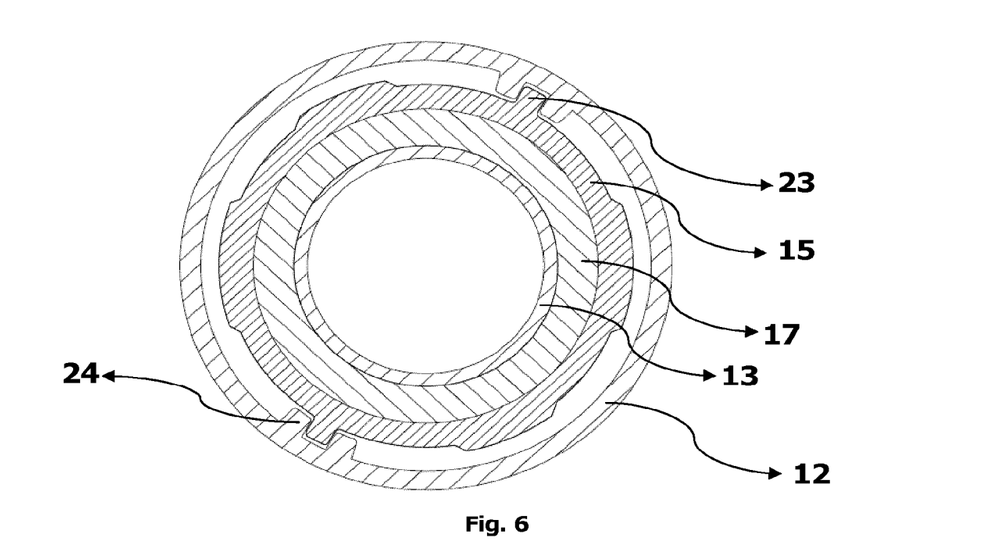
FIG. 6 demonstrates a cross-sectional view of the shock absorber device taken along a plane on the friction element, which is perpendicular to the longitudinal axis of the shock absorber device according to the present invention.

A circumferential protrusion (26) on the inner surface of said alignment member (15) extending circumferentially in contact with said friction element (17) around the same fix the position of the friction element (17) with respect to the friction element alignment member (15). By this way, it is ascertained that the friction element (17) is always integral with the alignment member (15). During the back and forth movement of the alignment member (15) having the friction element in contact with the outer surface of the piston (13), the multiple tips (25) of the friction element (17) hit the inner surfaces of the two bearings (18) or (19). The plurality of the tips (25) of the friction element (17) is clearly seen in FIGS. 2, 5a and 5b. The tips (25) of the friction element (17) may be triangular or cornered as seen in FIG. 5a in which case the friction element (17) looks like a zig-zag shaped planar element when separated apart from the alignment member (15). In an alternative embodiment the multiple tips (25) of the friction element (17) may be rounded off or made circular as seen in FIG. 5b. In this latter case, the friction element (17) looks like a zipper element when separated apart from the alignment member (15).

It must be mentioned that the core idea underlying the present invention is the fact that the friction element (17) has tips (25) or protrusions which extend, parallel to the longitudinal direction of the piston, towards the two bearings (18) or (19) and which hit the inner surface of either of two bearings (18) or (19) during the oscillatory back and forth movement of the alignment member (15). Once the plurality of the tips (25) of the friction element (17) hit the inner surface of the closed volume, they deform in shape such that the tip is partly buried or smashed back towards the inner body of the friction element (17) and partly fill the gaps formed in between neighbouring tips (25). As is well known in the art, the material of the friction element is usually a non-woven that is produced by matting, condensing and pressing woollen fibres. It is soft and suitable for non-plastic deformations, and usually selected from various felt materials. The fact that the plurality of tips (25) of the friction element (17) are subject to deformation in shape, i.e. they are smashed upon hitting either of the two bearings (18) or (19) during vibratory movement, clearly reveals excellent noise reduction aspect of the present invention. In another aspect, the present invention provides a shock absorber which functions smoothly and provides excellent dampening properties.

Figure 4:
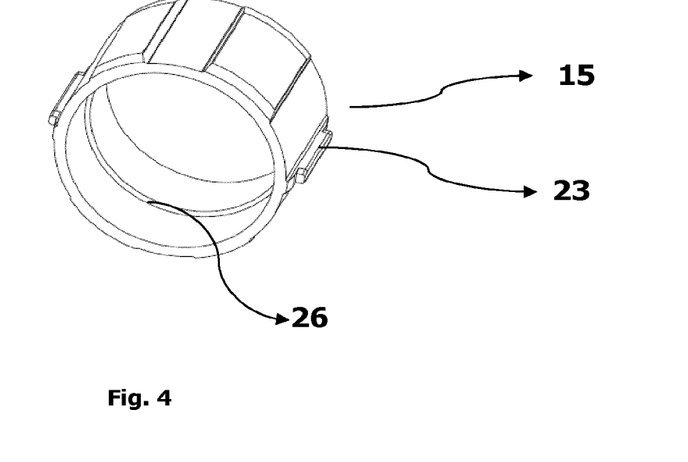
FIG. 4 demonstrates a cross-sectional view of the shock absorber device friction element alignment member according to the present invention.

As is seen in FIG. 4, the alignment member (15) has a pair of outer bearing ribs (23) which extend parallel to the longitudinal axis and spaced circumferentially 180 degrees apart from each other and which prevent rotation of the shock absorber piston (13) with respect to the shock absorber casing (12) around the longitudinal axis. Those bearing ribs (23) are movable in the longitudinal axis direction within grooves (24) located inside the shock absorber casing (12).

Under drum oscillations, said friction element (17) and the friction element alignment member (15) are functional without contacting said shock absorber casing (12). When oscillations exceed a certain amount, the friction element (17) hits or contacts either of the bearing (19) on the lock ring (16) or the bearing (18) on the casing (12). Even in the event that the oscillation amount reaches a certain level, the friction element alignment member (15) does not contact the bearings (18, 19) since its inner diameter is larger than the outer diameter of the two the bearings (18 and 19). The purpose is to avoid contact of two non-flexible pieces during vibration and is to establish dampening softly with the shape deforming flexible tips (25) of the friction element (17). Thereby, a vibration transmission that might be transferred from the friction element (17) to the machine frame via the shock absorber piston (13) is prevented.

Since the friction element (17) is fixed between the friction element alignment member (15) and the shock absorber piston (13) only by means of a circular protrusion (26), contact of the friction element (17) with said bearings (18, 19) smoothens the transition of the shock absorber device (11) from the free motion to the damping state.

In a nutshell, the present invention features a shock absorber device (11) comprising a substantially tubular first portion (12) telescopically receiving a substantially tubular second portion (13). Said first portion comprising a friction element alignment member (15) forcing a friction element (17) radially towards said second portion (13) such that friction occurs when second portion (13) makes longitudinal movement within said first portion (12). Said friction element (17) is wrapped around said second portion (13) by said alignment member (15) whose inner diameter is larger than the outer diameter of the two bearings (18 and 19) defining a closed volume within which the friction element (17) has a certain play in the longitudinal direction of the shock absorber. Contact of said friction element (17) with said bearings (18, 19) result in smashing of the plurality of the tips/protrusions (25) of the friction element (17).

During contact of said tips (25) with said bearings (18, 19), said tips deform into a less protruding form to fill the gaps between neighbouring tips (25). Therefore it may be assumed that the larger number of tips (25) formed on the friction element (17) would result in a more dense and harder friction element. The less number of tips (25) formed on the friction element (17) would result in a more elastic friction element. The person skilled in the art may easily appreciate that the tips (25) of the friction element need not be evenly distributed and may have varying distances in between any pair of neighbouring tips arranged alongside the friction element.

The invention claimed is:

1. A shock absorber comprising a tubular first portion in the form of a shock absorber casing telescopically receiving a tubular second portion in the form of a piston, said first portion comprising an alignment member which encapsulates a friction element wrapped around said second portion and which is longitudinally movable in between a first stop bearing and a second stop bearing such that friction occurs in between the friction element and the piston during the oscillatory relative movement of said first and second portions, wherein the friction element is entrapped within a closed volume the outer ends of which are defined by the two stop bearings and wherein the friction element has a plurality of tips which extend, parallel to the longitudinal direction of said piston, towards at least one of the two bearings and which hit either of said bearings during the oscillatory back and forth movement of said alignment member during operation, and wherein the inner diameter of the alignment member is larger than the outer diameters of the two stop bearings whereby it is ensured that at least one of the tips of the friction element contacts at least one of the two stop bearings during use of the shock absorber.

2. The shock absorber as set forth as in claim 1, wherein said friction element alignment member comprises a peripheral protrusion physically deforming said friction element such that the latter is fixedly secured between the shock absorber piston and the alignment member.

3. The shock absorber as set forth as in claim 1, wherein said friction element alignment member comprises outer longitudinal extensions which are parallel to the longitudinal axis direction and are spaced circumferentially apart from each other and which cooperate with corresponding grooves located on the inner surface of the shock absorber casing so that relative rotation of the said friction element alignment member within said shock absorber casing around the longitudinal axis is prevented.

4. The shock absorber as set forth as in claim 3, wherein said outer longitudinal extensions are movable in the longitudinal axis direction within the grooves located on the inner surface of said shock absorber casing.

5. The shock absorber as set forth as in claim 1, wherein a bearing gap is provided in between said shock absorber casing and said friction element alignment member.

6. The shock absorber as set forth as in claim 5, wherein said bearing gap is opened to upper and lower isolation spaces respectively defined in the proximity of said stop bearings.

7. The shock absorber as set forth as in claim 1, wherein said tips of said friction element are in the form of a plurality of edges that are cornered.

8. The shock absorber as set forth as in claim 1, wherein said tips of said friction element are m the form of a plurality rounded-off protrusions.

9. The shock absorber as set forth as in claim 1, wherein said plurality of the tips of said friction element have varying distance in between any subsequent pair of tips.

10. The shock absorber as set forth as in claim 1, wherein said friction element is a longitudinal strip of a flexible material.

11. The shock absorber as set forth as in claim 8, wherein the tips of the friction element are deformable in shape such that, in use, they deform in shape and fill the gaps in between neighbouring tips.

12. The shock absorber as set forth as in claim 7, wherein said plurality of the tips of said friction element have varying distance in between any subsequent pair of tips.

13. The shock absorber as set forth as in claim 8, wherein said plurality of the tips of said friction element have varying distance in between any subsequent pair of tips.

14. The shock absorber as set forth as in claim 7, wherein said friction element is a longitudinal snip of a flexible material.

15. The shock absorber as set forth as in claim 8, wherein said friction element is a longitudinal strip of a flexible material.

* * * * *